United States Patent [19]

McGinniss

[11] Patent Number: 4,566,962
[45] Date of Patent: Jan. 28, 1986

[54] ELECTRODEPOSITED CONTINUOUS THIN FILM TRANSFER PROCESS FOR PRODUCING FILM FUNCTIONAL AS BARRIER COATINGS

[75] Inventor: Vincent McGinniss, Delaware, Ohio

[73] Assignee: Battelle Development Corporation, Columbus, Ohio

[21] Appl. No.: 565,071

[22] Filed: Dec. 23, 1983

[51] Int. Cl.[4] ............... C25D 13/06; C25D 13/10
[52] U.S. Cl. .................... 204/180.9; 204/300 EC; 204/181.6; 204/181.7; 204/181.4
[58] Field of Search .......... 204/181 F, 181 R, 181 C, 204/300 EC

[56] References Cited

U.S. PATENT DOCUMENTS

| | | | |
|---|---|---|---|
| 3,424,663 | 1/1969 | Weigel | 204/181 R |
| 3,709,808 | 1/1973 | Hammond, Jr. | 204/181 F |
| 3,753,885 | 8/1973 | Hammond, Jr. | 204/181 R |

*Primary Examiner*—Andrew H. Metz
*Assistant Examiner*—B. J. Boggs, Jr.
*Attorney, Agent, or Firm*—Benjamin Mieliulis

[57] ABSTRACT

Novel electrodeposited coating copolymer blends for a transfer process are disclosed enabling copolymers displaying high adhesion to metals, and which normally cannot be contact transferred, to be made readily transferable as thin continuous barrier films preferably 0.3 mil in thickness or less.

12 Claims, 2 Drawing Figures

ELECTRODEPOSITED CONTINUOUS THIN FILM TRANSFER PROCESS FOR PRODUCING FILM FUNCTIONAL AS BARRIER COATINGS

BACKGROUND OF THE INVENTION

1. Field of the Invention

This present invention relates to electrocoating resin technologies. More specifically, it relates to a novel electrocoating process which enables the rapid uniform thin film deposition of a continuous (free of pin holes) coating onto one substrate and enables the subsequent rapid removal and transfer of said coating onto another substrate. This invention discloses compositions of electrodepositable polymers useful in the new process. Novel electrodeposited coating copolymer blends for a transfer process are disclosed enabling copolymers displaying high adhesion to metals, and which normally cannot be contact transferred, to be made transferable as thin continuous barrier films.

2. Description of the Prior Art

Electrodeposition of coatings is a process that is used in a significant variety of industrial applications from the lacquering of food cans to the painting of appliances and commercial vehicles. In electrodeposition, the coating materials are deposited from a water-based or solvent medium onto a substrate. Sometimes known as electrophoretic painting, the technology of electrodeposition of coatings encompasses the deposition of film when a d.c. current is applied to an article which is immersed in generally an aqueous dispersion stabilized with a colloidal electrolyte. In the electropainting process, it is generally the case that the particles in the disperse phase carry a negative charge and migrate towards the anode when an electrical potential difference is applied to the system. However, both anodic and cathodic polymers are known.

When polymers are being electrodeposited with aqueous systems, generally it is necessary for the polymer to be hydrophillic so as to be soluble in bulk but the polymer must also be capable of producing continuous and water insoluble films on air drying or storing.

Conventional electrocoating technology employs two general classes of polymer systems: (1) anodic polymers such contain carboxylic poly-anion functional groups and (2) cathodic polymers which contain amine salt poly-cation functional groups.

In conventional anodic/cathodic electrodeposition of coatings technology a carboxylic anion functional polymer in solution will migrate and deposit onto a positively charged substrate (anode) while a cation (amine quaternary salt) functional polymer in solution will migrate and deposit onto a negatively charged substrate (cathode).

The polymer systems in their anion or cation states are solvent soluble or dispersable but when a current is passed through the coating solution, electroneutralization takes place and the polymers become insoluble at the electrode/substrate interface or precipitate out onto the substrate surface.

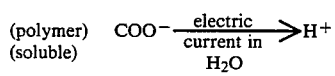

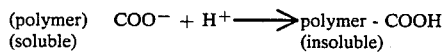

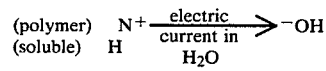

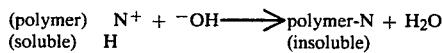

Various patents such as U.S. Pat. Nos. 3,304,250, 3,444,064 and 3,444,063 are directed to maintaining the operational stability of various electrodeposition baths. Other patents such as U.S. Pat. Nos. 3,230,162, 3,434,988 and 3,450,660 describe specific coating formulations suitable for electrodeposition. While the larger portion of electrodeposition formulations described are aqueous dispersed systems, patents such as U.S. Pat. No. 3,450,655 describe nonaqueous colloidal suspensions in organic solvents.

The processes of electrophoretic painting or electrodeposition yield coated articles, the coatings of which have excellent metal adhesion or bonding, but once deposited onto a substrate these coatings are not readily removable or transferable to any other substrate. This invention teaches how to make selected normally nontransferable copolymers to be transferable as thin continuous films.

Electrocoating resins typically display excellent adhesion to metal substrates. This excellent adhesion to a primary substrate is not always desirable as, for example, for forming, by a transfer process, articles having thin film barrier coatings. Commercial production of thin film coated articles is hindered by the absence of suitable formulations and methods for forming or transferring uniform continuous thin films to articles. By continuous is meant being free of pin holes, i.e., able to function as a barrier coating. Certain fine films useful as barrier coatings are costly and commercialization is prevented by absence of suitable formation and transfer technology. It has been found that only certain types of additives (elastomeric releasing agent) can be mixed with selected conventional electrocoating resin systems (electrodepositable polymer) to allow their release from an electrodeposit-coated metal surface.

Thin uniform continuous films are desirable for use in barrier coatings and related applications, however, technology to produce and transfer thin (submicron), continuous (free of pin holes) films has been absent until the present invention.

U.S. Pat. No. 3,753,885 describes a process for producing "coherent organic polymeric films". The process in U.S. Pat. No. 3,753,885 is essentially a flocculation process involving countercurrent flow and uses conductive particles to form a wet conductive polymeric film. The resultant films of the process in U.S. Pat. No. 3,753,885 are typically 1 mil or thicker and the preferred thicknesses of the process in U.S. Pat. No. 3,753,885 are 0.5 to 2.0 mils. Films produced according to the process in U.S. Pat. No. 3,753,885 are coherent but they are not continuous (see Example 23 herein). The resultant films of the process in U.S. Pat. No. 3,753,885 have a significant water content.

SUMMARY OF THE INVENTION

The present invention teaches use of a blend of at least two copolymers which form nonconductive but easily removed essentially dry, uniform, continuous (free of pin holes) thin films. By thin film or fine film is meant uniform continuous films less than 1 mil, generally 0.3 mil or less. The copolymers usable in the present invention typically form uniform colloidal dispersions akin to solutions. The useful copolymers of this invention include latex copolymers, solvent-dispersed copolymers, oil-solivated copolymers, and dry powder copolymers.

An object of the present invention is to enable the rapid uniform thin continuous film deposition of a polymeric electrodepositable coating onto one substrate and to enable the subsequent rapid removal and transfer of said continuous coating onto another substrate. Another object of this invention is to disclose compositions of electrodepositable polymer systems useful in the new process. A further object of this new process is to enable the rapid transfer of thin, uniform, continuous organic coatings functional as barrier coatings from one surface of an object such as a rotating metal cylinder on which the coating is electrodeposited, to the surface of another object such as paper, wood, plastic tape or other suitable surfaces.

In accordance with the present invention and the process disclosed herein, it has been found that thin continuous films or coatings formed from a blend of two copolymers can be electrodeposited onto one substrate and subsequently rapidly removed and contact transferred onto another substrate.

The invention comprises a process for continuous uniform thin film electrodeposition onto one substrate and transfer to another substrate. In this invention, the first substrate which is electrically conductive, preferably stainless steel, and to which a voltage is applied, is momentarily immersed into a coating tank. A continuous coating according to this invention is electrodeposited onto the first substrate. This continuous coating can then be contact transferred to a second substrate.

Advantageously the first substrate can be a stainless steel cylinder. The cylinder can be placed in simultaneous contact with the dispersed electrodepositable coating solution and a second substrate. The cylinder acts to provide a surface for electrodeposition of the thin film polymer and then lifts and transfers the formed thin film polymer to the second substrate yielding a continuous process.

In the coating tank, and according to the teachings of this invention, should be dispersed or solivated a blend of at least two copolymers. The first copolymer or coating copolymer can be any common or commercially available solivated or dispersed elctrocoating anodic or cathodic copolymer. To this anodic or cathodic copolymer an elastomeric releasing agent which is also a copolymer is intimately added and mixed.

The copolymer acting as elastomeric releasing agent it has been found generally must have a low acid number, preferably less than 100 (per ASTM Method D 1980-61); must have elongation of at least 100%; and must have a glass transition temperature (Tg) that is greater than 0° C. Where the elastomer releasing agent is a cationic polymer then in place of a low acid number, the elastomer should have a low amine value, preferably less than 30-60 in nonvolatile solids content. Any elastomer or polymer can function as the release-effecting additive of this invention provided the elastomer can meet the above three criteria relative to low acid number (or low amine value), elongation of 100% or more, and a glass transition temperature greater than 0° C. It has been found that elastomers satisfying these three criteria generally have molecular weights in excess of 10,000. Copolymers are preferred however homopolymers and graft polymers meeting the criteria can also be used. No upper limit to the molecular weight is known as elastomers of infinite molecular weight could be physically ground to effect dispersion with the anodic or cathodic electrodepositable polymer.

By elongation is meant that an elastomeric material can undergo reversible extension under cyclic stress conditions. Elastomers have elongation values at their beaking point above 100%. The change in the length of the elastomer under stress is greater than its original unstressed value.

The major requirements for the coating anodic or cathodic electrodepositable polymer for effective release and transfer of such coatings are: at least 100 percent elongation, low polar functionality (acid or amine equivalency, acid number less than 100 or amine value less than 60) and low surface energies (<50 dyne/cm).

An exception to the requirement of having a blend of two copolymers are anodic or cathodic polymers which are silicon oils or polymers having low or high percentages of elongation but low acid amine functionalities. These polymers uniquely, it has been found, can operate without release effecting additives in this invention due to their atypically low values in surface energy compared to other polymer systems. $\gamma = 20-26$ dyne/cm for silicone oils/polymers while nylons and polycarbonates have values in the range of 36-42 dyne/cm. Polybutadienes have values in the 30-35 dyne/cm range. Percent elongation is also important in that those polymer structures with percent elongation much below 100% do not appear to work as well as those polymers having greater degrees of flexibility. High neutralizable acid value or high neutralizable amine value polymers do not appear to function in an acceptable manner in this invention.

The invention has been successfully adapted to coating internal surfaces of a mold cavity as the first substrate. The electrodeposited polymer is then transferred from the surface of the mold cavity to the plastic, thermoplastic or thermoset, which is injected into the mold cavity. The invention is advantageously practiced with an injection molding apparatus but would be easily adaptable, by anyone skilled in the art, to compression, transfer, injection-compression or other related processes. The particular molding method adopted is not particularly critical. The only requirement is that the mold cavity lends itself to electrodeposition.

BRIEF DESCIPTION OF THE DRAWINGS

DETAILED DESCRIPTION OF INVENTION

Copolymers displaying high adhesion to metals and which normally cannot be contact transferred can be made transferable, by the teachings of this invention, and further can be made to transfer as thin continuous barrier films generally 0.5 mil in thickness or less, and preferably 0.3 mil or less.

Figure 1:
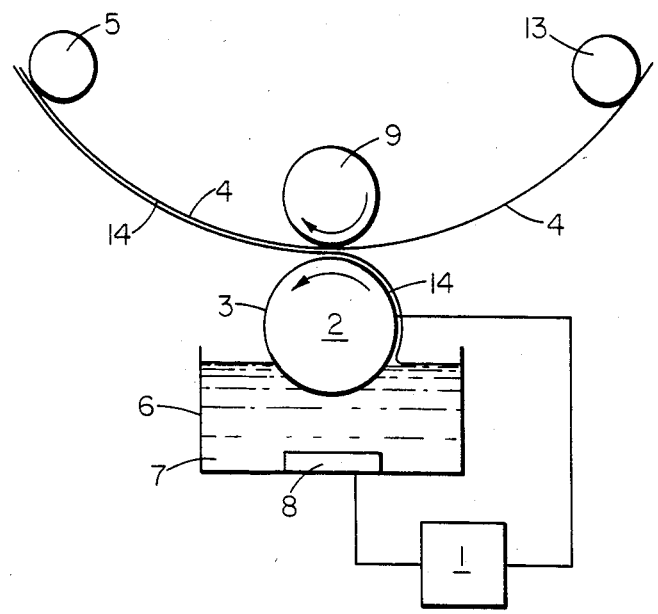
FIG. 1 is a schematic depicting a system for electrodeposition of continuous films onto a rotating first substrate for subsequent transfer to a second substrate.

In FIG. 1 the dispersed electrodepositable coating solution 7 is held in a coating tank 6 which contains an immersed electrode 8 connected to power source 1 of positive and negative electrical potential. Said power source 1 is also connected to the metal roll electrode 2 whose surface advantageously is used as the first substrate 3. Optionally the metal roll electrode 2 can be covered with a microporous Teflon ® sleeve (not shown). The metal roll electrode 2 is positioned so as to simultaneously contact the coating solution 7 and the second substrate 4, said second substrate 4 in this particular configuration is shown held against the metal roll electrode 2 by an optional but advantageous pressure roll 9. The second substrate 4 is shown being supplied from feed roll 13 and after the electrodeposited coating 14 on the first substrate 3 transfers to the second substrate 4, said second substrate 4 together with transferred coating 14 is collected on uptake roll 5.

Figure 2:
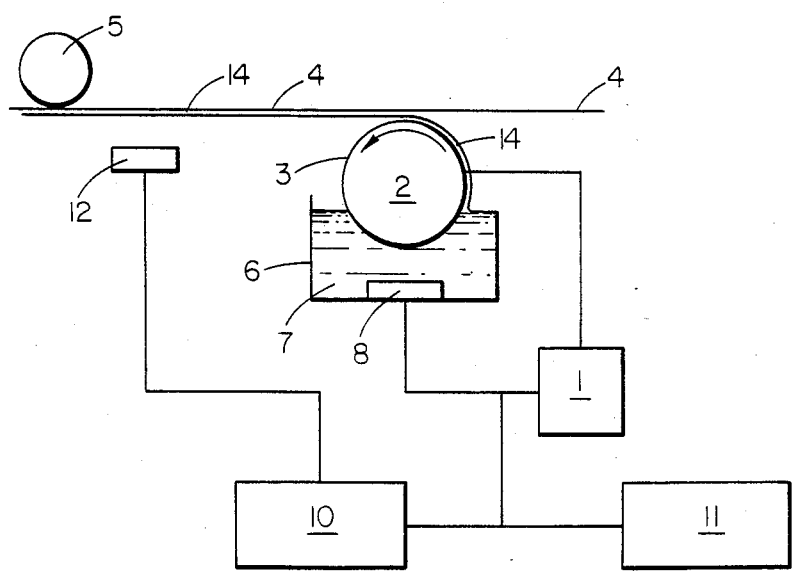
FIG. 2 is a schematic of a self-monitoring coating station according to the disclosure of this invention.

In FIG. 2, the entire coating transfer process is automated by the addition of certain monitoring functions to the system disclosed in FIG. 1. Logic circuit or microcomputer 10 is connected to film thickness sensor 12, to roll speed controller 11 and in series (not shown) to power supply 1. In response to the data generated by film sensor 10 the current to electrodes 2 and 8 and/or to the roll speed controller can be respectively increased or decreased by logic circuit 10. Thickness of final coating transferred to the second substrate 4 can be regulated by decreasing or increasing the rate of electrodeposition via voltage regulation or can be regulated by reducing residence time or time of contact of the second substrate 4 with the metal roll electrode 2 whose surface 3 is advantageously used also as the first substrate.

A release effecting additive herein referred to as an elastomer is dispersed together with an electrodepositable polymer in a coating tank and the two are physically mixed to form an intimate blend.

By inpressing a voltage between the electrodes according to techniques known by those skilled in the art, the electrodepositable polymer-elastomer blend is deposited onto the first substrate.

The first substrate is contacted to a second substrate so as to obtain greater adhesion between the electrodeposited polymer-elastomer blend on the first substrate and the second substrate than the adhesion between the electrodeposited polymer-elastomer blend on the first substrate and the first substrate. The net result is that the electrodeposited polymer-elastomer blend transfers to the second substrate when the two substrates, following contact, are separated from each other.

The disclosed process can be applied to water dispersed or organic solvent coating systems. Either anodic or cathodic polymers can be used. Among the useful electrodepositable anodic polymers are, for example and not by way of limitation, any of the carboxyl-terminated acrylic, styrenic, urethane, polyester or silicone polymers. Among the useful electrodepositable cathodic polymers are, for example and not by way of limitation, any of the amine-terminated phosphonium, ammonium, or sulfonium epoxies.

It has been found that the electrodepositable polymers, preferably copolymers, should have at least 100% elongation; have low polar functionality (acid or amine equivalency i.e., acid # less than 100 or in the case of cationic polymers an amine value less than 60); and have low surface energies (<50 dyne/cm).

The release effecting additive can be any elastomer or polymer having: (1) a low acid number preferably less than 100 (or in the case of a cationic polymer a low amine value, preferably less than 60.); (2) an elongation of at least 100%; and (3) a glass transition temperature that is greater than 0° C. It has been found that the elastomers satisfying these criteria generally also have molecular weights in excess of 10,000.

The Tg for copolymers can be readily calculated from the Tg of the respective homopolymer formed from the component monomers as follows:

$$\frac{1}{Tg} = \frac{\text{Weight monomer}_1}{Tg_1} + \frac{\text{Weight monomer}_2}{Tg_2} + \frac{\text{Weight monomer}_n}{Tg_n}$$

It has been found that a relationship exists between elongation of a copolymer and its Tg approximated as follows:

log (% elongation) ≅ k (Tg)

A high (+) Tg value is related to high Tg value monomers present in the copolymer.

A low (−) Tg value is related to low Tg value monomers present in the copolymer.

TABLE 1

| Examples of High Tg Value Homopolymers | |
|---|---|
| Homopolymer | (+) Tg° C. |
| styrene | 100 |
| methylmethacrylate | 105 |
| ethylmethacrylate | 65 |
| butylmethacrylate | 20 |
| methyl acrylate | 8 |
| acrylonitrile | 105 |
| acrylic acid | 87 |

TABLE 2

| Examples of Low Tg Value Homopolymers | |
|---|---|
| Homopolymer | (−) Tg° C. |
| ethyl acrylate | −22 |
| butyl acrylate | −54 |
| butadiene | −34 (average) |

TABLE 3

| Latex Copolymers | Tg | % elongation |
|---|---|---|
| *15% methylmethacrylate + 85% ethyl acrylate | −7 | 1000–1500 |
| 30% methylmethacrylate + 70% ethyl acrylate | 8 | 300–600 |
| 45% methylmethacrylate + 55% ethyl acrylate | 25 | 200–300 |
| 55% methylmethacrylate + 45% ethyl acrylate | 36 | <200 |
| 50% styrene + 50% butylacrylate | 3 | 500–600 |
| *65% methylmethacrylate + 35% ethyl acrylate | 50 | <100 |
| *24% styrene + 76% butadiene | −59 | 1400–1600 |
| 45% styrene + 55% butadiene | +9 | 300–400 |

* = not useful as release effective elastomer

The release effecting additive is dispersed together with the electrodepositable polymer in the coating tank and the two are physically mixed to form an intimate blend. The exact amount of elastomer that needs to be added to effect the desired transfer properties is expected to vary with the particular electrodepositable polymer coating to be transferred; however, it has been found that elastomer added even in amounts as low as 1% is effective. A release-effective amount of additive is understood herein to mean that quantity necessary to impart transfer properties to the electrodeposited coating on the first substrate, which is electrically conductive, preferably metallic, such that the electrodeposited coating upon contact with the second substrate, preferably non-metallic, transfers to said second substrate and separates from said first substrate.

If the second substrate is metallic, care must be taken to select the metals of the first and second substrates such that the polymer desired to be transferred has a perceptible higher affinity or adherence to the metal forming the second substrate than the metal of the first substrate. For example, making the first substrate copper and the second substrate stainless steel generally would be effective in the transfer process of this invention.

Those skilled in the art would preferably choose to match compatible elastomers and electrodepositable polymers in the coating tank; however, if the preceding criteria are met for the elastomer and the electrodepositable polymer respectively, even a latex elastomer could be added to an organic solvent dispersed electrocoating polymer and still function in the invention. Likewise an elastomer which is a carboxylic anionic functional polymer satifsying the criteria for the elastomer additive and a cationic electrodepositable polymer satisfying the enumerated criteria for the electrodepositable polymer will function in this invention. The above two elastomer-electrodepositable polymer systems, while not preferred, are cited as illustrative of the broad applicability of this invention.

The first substrate generally must be metallic as it must conduct electricity and be receptive to electrodeposition. In one embodiment of this invention, a stainless steel cylinder was used as the first substrate. Where a metallic cylinder, as opposed to a sheet, plate, or mold cavity is used as the first substrate, the metallic cylinder may advantageously be covered with a microporous electron coating sleeve such as microporous Teflon ® or sintered Teflon ® of defined pore size so as to permit electron transfer but restrict macromolecules. This Teflon ® coating would facilitate transfer to the second substrate by reducing adhesive forces between the first substrate and the electrodeposited coating polymer.

The second substrate can be almost any solid substrate material including, for example, paper, plastic, metal or wood. Suitable surfaces include generally any type of solid surface and among the plastics only polyolefinic materials are not preferred but can be employed where the electrodeposited polymer is melt fused onto a polyolefinic second substrate.

In certain electrodepositable polymer systems such as polycarbonate, a solvent such as a ketone can be introduced to the coating tank or onto, for example, the second substrate, when paper is used as the second substrate, to dissolve the polycarbonate into the paper to improve adhesion. With thermoplastic polymers heat can also be advantageously applied via the metal cylinder electrode to melt fuse the polymer onto the second substrate to improve bonding in transfer. Said technique of melt fusing would be especially advantageous where the second substrate were a polyolefin.

The advantage of the process of this invention is that upon electrodeposition of the coating polymer to the first substrate the solvents in the coating tank are excluded from interfering with the transfer process to the second substrate. For all practical purposes, except for the electrodeposition, the entire transfer process is a dry process.

Additional advantages of the invention are that uniform thin continuous film deposition even of high molcular weight polymers is achievable. Many of these high molecular weight polymers cannot be uniformly deposited as continuous thin films by any other known means. This invention and this new technology expands the field of commercially possible, useful fine film barrier coatings. Very thin continuous uniform films can be deposited by this process because the controlling film formation driving force is electrochemical and not solvent evaporation as exhibited in other coating technologies. A wider variety of polymer coating systems, reactive or nonreactive, can be rapidly and efficiently deposited and transferred by this technique than can be accomplished by other processes.

To make decorative transfers of fine films, it is possible to mask the first substrate so that only selective electrodeposition takes place and then transfers. In this way, films of ornate designs could be quickly produced and transferred. Alternatively, the first substrate can be made discontinuous or patterned to likewise achieve a formation and transfer of a film having a particular configuration.

Another advantage of this process is that film formation on the metal roll electrode or first substrate is strongly controlled by coating both solids (% polymer dispersed in solven), current density and residence time or roll speed which allows for continuous monitoring of film weights and coating thickness for ultimate feedback control of the coating process.

This process forms and transfers uniform thin films of less than 1 mil. Films of 0.3 mil thickness are easily achievable.

An example of the ability of this process to control film weights on a paper substrate is shown in Table 4.

Conventional dip/roll coating processes produced uneven film weights but the process disclosed by this invention exhibited very little deviation in film weight coverage.

TABLE 4

COMPARISON OF CONVENTIONAL COATING TECHNIQUES WITH THE ELECTRODEPOSITED COATING TRANSFER PROCESS AS TO ABILITY TO CONTROL FILM WEIGHT ON PAPER SECOND SUBSTRATE

| Weight of Uncoated Paper Stock | Weight of Coated Paper Stock After Conventional Roll Process | Weight of Coated Paper After Electrocoating Transfer Process of this Invention |
|---|---|---|
| Sample A 0.340 | 0.342 | 0.381 |
| B 0.340 | 0.354 | 0.380 |
| C 0.340 | 0.360 | 0.380 |

Coating system was a pigmented/acrylic water dispersable formulation.

SPECIFIC EMBODIMENTS OF THE INVENTION

The invention is illustrated by the following examples which are intended merely for purposes of illustration and are not to be regarded as limiting the scope of the invention or the manner in which it may be practiced. Unless specifically indicated otherwise, parts and percentages are given by weight.

In the examples, the electrodepositable polymers and elastomers used to illustrate the invention were selected from both laboratory prepared and commercially available electrodepositable polymers and elastomers. XC-4011 is a product of and Cymel ® is a trademark of American Cyanamid Company, Resins and Adhesives Department, Wayne, New Jersey 07470. Hycar ® and Goodrite ® are trademarks of the B. F. Goodrich Chemical Compamy, 6100 Oak Street Blvd., Cleveland, Ohio 44131. Versamid ® is a trademark of General Mills Company. Lexan ® is a trademark of the General Electric Company. DOW ® is a trademark of the Dow Chemical Company, Midland, Mich. Epon ® is a trademark of Shell Oil Company.

EXAMPLE 1

| Preparation of Latex Copolymers (styrene butyl acrylate latex) resin | |
|---|---|
| Ingredients | Parts |
| styrene | 49.25 |
| butyl acrylate | 49.25 |
| methacrylic acid | 1.0 |
| acrylic acid | 0.5 |
| sodium bicarbonate | 0.3 |
| potassium persulfate | 0.3 |
| sodium lauryl sulfate | 2 |
| deionized water | 126.45 |

POLYMERIZATION PROCEDURE

The styrene, butyl acrylate, acrylic acid and methacrylic acid monomers are mixed together and purged for 30 minutes with nitrogen. The deionized water, sodium bicarbonate and 0.1 parts of the sodium lauryl sulfate are added to the reactor and purged with nitrogen for 30 minutes while being agitated with a stirrer speed of 100 rpm. The reactor is slowly heated to 75° C. while being purged with nitrogen. After completion of the nitrogen purge the potassium persulfate was added to the reactor. Five minutes after the persulfate addition, 10% of the monomer mix is added. Fifteen minutes after the 10% monomer addition, a dropwise addition of the remaining monomer solution is started and the rate adjusted to give a 3 hour addition time. The remaining 1.9 parts of sodium lauryl sulfate is diluted to 50 grams with deionized water and the solution was added at a uniform continuous rate concurrently with the monomer addition. A nitrogen atmosphere is maintained in the reaction flask during the polymerization and 1½ hour digestion periods.

EXAMPLE 2

| Preparation of Fumaric Acid Modified Oil Copolymer TUNG OIL - FUMARIC ACID ADDUCT | | |
|---|---|---|
| Formulation | | |
| Tung Oil | 1 mole | 872 g. |
| Fumaric Acid | 2 moles | 232 g. |
| Constants | | |
| % N.V. | 100 | |
| Viscosity | $Z_{10}$ + | |
| Color | 9 | |
| Lbs./gal. | 8.75 | |
| Acid Number | 195–205 | |
| Functionality | 4 | |

EQUIPMENT

Three liter three neck round bottom reaction flask or resin kettle, agitator, inert gas inlet, thermometer, condenser and heating mantle.

PREPARATIVE PROCEDURE

1. Charge the oil to the flask. Cover with an inert gas blanket. Begin slow agitation and heating.
2. Charge the fumaric acid. Heat rapidly to 190° C. Decrease the rate of heating and raise the temperature to 200° C. CAUTION: During the initial heat up, if the temperature is allowed to rise above 200° C. dangerous foaming may occur. However, foaming will not occur at or below 200° C.
3. Hold at 200° C. for 45 minutes or until a drop of resin when viewed under a 133X microscope is free of unreacted fumaric acid particles.

It is advantageous to avoid water cooling of the condenser. A cold condenser will trap sublimed fumaric acid, whereas a warm condenser will permit vapors to wash the acid back into the flask. As the reaction proceeds, insure sufficient agitation such that the acid is washed from the sides of the container.

4. Discharge the contents of the flask before it cooks to 100° C. When the adduct is stored prior to use, it should be maintained under an inert atmosphere. It can be effectively transferred to reaction vessels by heating to a temperature high enough to insure flow.

| Manufacture of Copolymer Useful as Coating Resin | | |
|---|---|---|
| Formulation | | |
| Tung Oil | 1 mole | 872 g. |
| Fumaric acid | 2 moles | 232 g. |
| Pentaerythritol | 2 moles | 272 g. |
| Water | | 740 g. |
| Constants | | |
| % N.V. | 65 | |
| State | Water in oil emulsion | |
| Lbs./gal. | 8.4 | |
| Acid Number | 99 at 100% solids | |

EQUIPMENT

Three liter three neck reaction flask or resin cooker, heating mantle, condenser, thermometer, inert gas inlet and water trap.

PREPARATIVE PROCEDURE

1. Prepare the tung oil-fumaric acid adduct according to the instructions provided.
2. Cool to 160° C. and add the pentaerythritol.
3. Add 20% Solvesso 100 based on resin solids. Add water trap to the equipment and begin water cooling of the condenser. Maintain inert blanket.
4. Raise temperature to 165° C. Adjust to reflux. As the reaction proceeds, allow the temperature to rise to 185° C., but no higher. Retain this temperature until an acid number of 90–95 is achieved.
5. Cool to 100° C. Dilute to 60–65% solids with distilled water. A stable water in oil emulsion will form. No solubilizing agent is needed at this point.

PREPARATION

1. Weigh resin containing 200 g. of solids into a 2 liter beaker. Add 18.5 g. of diethanol amine.
2. Work up to a solution by hand.
3. Dilute to 2 liters with distilled water.

| With Constants | |
|---|---|
| % N.V. | 10 |
| pH | 7.1 |
| Appearance | colloidal suspension |
| Deposition voltage | 190 |
| Throwing power[1] | 100% |
| Bath stability[2] | indefinite |
| Film properties | |
| Curing time at 200° C. | 6 min. |
| Rocker hardness | 30 |

|   |   |
|---|---|
| Film thickness | .8 mils. |
| Film appearance | smooth, glossy, few craters |
| Hours in salt spray[3] to 1 mm. creep at scribe | 200 |
| A.S.T.M.[4] grade on face of panel | 7-1 |

[1]Throwing power is determined by percent coverage of the inside of a 3" × 5" × ⅜" box.
[2]Bath stability refers to standing stability and is an indication of the hydrolytic stability of the polymer.
[3]Salt spray solution is 5% NaCl.
[4]A.S.T.M. method D-610-43-photographic standards reproduced by The Federation of Societies for Paint Technology.

EXAMPLE 3

Acrylic Anodic (high acid number) Electrocoating Carrier Resin

A solution acrylic polymer was made containing 495 parts ethyl acrylate, 355 parts styrene, 150 parts methyacrylic acid; initiated with 30 parts benzoyl peroxide in 287 parts of the monobutyl ether of ethylene glycol. The nonovolatile content of the polymer was 78 and had an acid number of 70 in the total solution composition.

EXAMPLE 4

Conventional Anionic Electrodeposition Resin

An acrylic anionic electrocoating resin according to Example 3 was made into a coating formulation in the following manner:

|   |   |
|---|---|
| Example 3 Resin | 324.3 g |
| Triethanolamine | 25.2 g |
| Distilled Water | 621.5 g |

This entire formulation was further diluted 1 part solution to 4 parts of water and then placed in a polyethylene container adapted for electrodeposition processing conditions. A polished stainless steel injection molding piece was connected to the anode, placed in the electrocoating bath formulation and subjected to 40 volts, 3 amps for 1, 2, and 5 minutes exposure times. The coated mold was then removed from the bath, dried and a thermoplastic resin [DOW ®—Styron ® 6087 (polystyrene/molding resin)] was melted (400 F.) and injected into the coated mold and allowed to cool. The mold was then separated for inspection off efficiency of electrodeposited coating transfer from the mold surface to the plastic surface. In this process and with this electrodeposition coating resin system, transfer from the mold to the plastic surface was almost nonexistent for all three electrodeposition conditions.

EXAMPLE 5

Same as Example 3, but a crosslinking resin and pigments were added according to the following formulation:

|   |   |
|---|---|
| According to Example 3 Resin | 324.3 g |
| Cymel ® 1156 (melamine resin) (crosslinker) | 81.1 g |
| Triethanolamine | 25.2 g |
| Titanium Dioxide (TiO₂) | 161.2 g |
| R-900 (Du Pont) Distilled Water | 379.2 g |

The first three materials were mixed together using a high speed dispersator. When a stable solution was reached, then the TiO$_2$ was added until fully mixed and 379.2 g of distilled water was added to this mixture under high shear conditions. After this solution was fully mixed, then a combination of 10% resin according to Example 3, triethanolamine, water, and 1% blue dye (Du Pont ® Monastral ® blue, B-BW-372-p, TS-44970) was added under continuous agitation.

This bath was then used to electrodeposit a blue tinted pigmented coating onto a mold surface (40 V, 3 amps, 1, 2, 5 minutes) followed by injection mold transfer (400 F) to a plastic substrate (Styron ® 6087—polystyrene), cooled and examined for completeness of coating transfer. With this system and these processing conditions, very little to no coating transfer was realized between the coated mold surface and the surface of the plastic substrate.

EXAMPLE 6

Conventional Cationic Electrodeposition Resin Technology

A cationic electrodeposition resion formulation, based on U.S. Pat. No. 4,176,110 was examined for its ability to be cathodically electrodeposited onto a metal mold surface and subsequently transferred to a plastic substrate during a typical injection molding processing sequence. All experimental conditions were similar for the anodic resin systems of Examples 3 and 4 and the results were very similar in that no coating transfer took place between the coated mold surface and the plastic substrate.

The cationic electrodeposition resin system in U.S. Pat. No. 4,176,110 was prepared by reacting epoxidized liquid polybutadiene resins (NISSEKI polybutadiene) E1500 (molecular weight 1500) with dimethyl amine (100 millimoles/100 g resin) and acrylic acid (100 millimoles/100 g resin).

EXAMPLE 7

Same as Example 3 except that to the electrocoating bath solution of Example 3 a release effecting elastomer was added. Enough butadiene-acrylonitrile (see preparation in Example 18 and see also Table 7) rubber resin was added to make a 10% dispersion (100 grams of the electrocoating solution from Example 1 plus 10 grams of butadiene-acrylonitrile resin (latex solution). This system was electrodeposited onto copper strips or stainless steel metal mold surfaces (100 V, 6 amps, 1 min) and exhibited complete transfer from the metal to a polystyrene or polycarbonate plastic substrte surface.

EXAMPLE 8

An alternative acrylic anodic electrocoating resin can be prepared by the solution polymerization of methymethacrylate (290 parts), ethyl acrylate (230 parts), butyacrylate, (320 parts), hydroxyethylacrylate (400 parts), and methacrylic acid (260 parts) dispersed in 600 parts of 2-butoxy-ethanol-1-solvent). This resin (acid number ≃70) likewise does not display coating transfer absent addition of a "release effective additive".*

EXAMPLE 9

Same as Example 3 and 4 but this time the conventional anionic electrodeposition carrier resin system was based on a fumaric acid modified oil as described in Example 2.

Electrodeposition of the resin in coating formulations and under indentical experimental conditions described in Examples 3 and 4 did not produce films that would be easily removed from the mold surface.

EXAMPLE 10

Same as Example 5 except 1 gram of Goodrite® 1872X6 resin (or other butadiene acrylonitrile polymers described in Table 7 could also be used) was added to 100 grams of the pigmented electrocoating solution in Example 4 and processed under identical conditions as before. This system demonstrated excellent in mold coating transfer to a polycarbonate or polystyrene substrate.

EXAMPLE 11

Same as Example 6 except for addition of Goodrite® 1800X73 (styrene butadiene) (other styrene-butadiene polymers described in Table 7 could also be used) at 3% levels which resulted in complete metal mold coating transfer to a polystyrene substrate.

EXAMPLE 12

Same as Example 11 except that the second substrate to which the electrodeposited coating was transferred was a molding grade Lexan® polycarbonate (General Electric®) material. This process resulted in complete transfer to the polycarbonate substrate.

EXAMPLE 13

Same as Example 11 but the electrocoated coating was transferred to a paper or cellulosic substrate.

EXAMPLE 14

Same as Example 11 but electrocoated coating was transferred to a polystyrene film material.

EXAMPLE 15

Similar experimental conditions as those described in Example 3, but with different release-effecting additives added at varying concentrations. The results are shown in Table 5.

TABLE 5

EFFECT OF CONCENTRATION OF RELEASE EFFECTING ELASTOMER ON ANODIC AND CATHODIC ELECTROCOATING RESIN SYSTEMS

| Electrocoating Resin (Electrodepositable Polymer) | Elastomer (Release Additive) | Results |
|---|---|---|
| XC-4011 | 0% | No transfer from metal mold surface to plastic surface |
| Anodic or the conventional electrocoating polymers described in Examples 3 and 8 | 0% | No transfer from metal mold surface to plastic surface |
| Anodic or the conventional electrocoating polymers described in Examples 3 and 8 | 1% Goodrite® 1800X73 or other release polymers described in Table 7 | Complete transfer from mold surface to plastic surface |
| Anodic or the conventional electrocoating polymers described in Examples 3 and 8 | 5% Goodrite® 1800X73 or other release polymers described in Table 7 | Complete transfer from mold surface to plastic surface |
| Anodic or the conventional electrocoating polymers described in Examples 3 and 8 | 10% Goodrite® 1800X73 or other release polymers described in Table 7 | Complete transfer from mold surface to plastic surface |
| Anodic or the conventional electrocoating polymers described in Examples 3 and 8 | 50% Goodrite® 1800X73 or other release polymers described in Table 7 | Complete transfer from mold surface to plastic surface |
| Anodic or the conventional electrocoating polymers described in Examples 3 and 8 | 1% GE® (SM-2035) silicone oil emulsion | Complete transfer from mold surface to plastic surface |
| Cationic Resin Aminated polybutadiene | 0% | No transfer |
| Cationic Resin Aminated polybutadiene | 1% Goodrite® 1800X73 | Complete Transfer |
| Cationic Resin Aminated polybutadiene | 5% Goodrite® 1800X73 | Complete Transfer |
| Cationic Resin Aminated poly- | 10% Goodrite® 1800X73 | Complete Transfer |

TABLE 5-continued
EFFECT OF CONCENTRATION OF RELEASE EFFECTING ELASTOMER ON ANODIC AND CATHODIC ELECTROCOATING RESIN SYSTEMS

| Electrocoating Resin (Electrodepositable Polymer) | Elastomer (Release Additive) | Results |
|---|---|---|
| butadiene Cationic Resin Aminated polybutadiene | 50% Goodrite ® 1800X73 | Complete Transfer |
| Cationic Resin Aminated polybutadiene | 1% GE ® (SM-2035) silicone oil emulsion | Complete Transfer |

Other types of resins and their critical structure relationships that can be used for electrocoated mold to plastic transfer or other metal to nonmetal surface transfer (ex. wood) operations are listed in Table 6.

TABLE 6
ELASTOMERS (RELEASE-EFFECTIVE ADDITIVES) USEFUL IN ELECTROCOATED MOLD TRANSFER OPERATIONS

| Resin (Type) | % Elongation | Acid No. | Effective in Coated Mold Release Capabilities |
|---|---|---|---|
| Hycar ® 2679 (acrylic) | 366 | 11–22 | Yes |
| Goodrite ® 2570X5 (styrene butadiene) | 1500 | 11–22 | Yes |
| Hycar ® 2600X83 (acrylic) | 2400 | 11–22 | Yes |
| Goodrite ® 1800X73 (styrene butadiene) | 350 | 11–22 | Yes |
| Hycar ® 2671 (acrylic) | 510 | 11–22 | Yes |
| Goodrite ® 1872X6 (butadiene-nitrile) | 1150 | 11–22 | Yes |
| Hycar ® 1572X45 (nitrile) | 940 | 30 | Yes |
| Hycar ® 2600X138 (acrylic) | 220 | 11–22 | Yes |
| Hycar ® 2600X91 (acrylic) | 340 | 11–22 | Yes |
| XC-4011 (acrylic) | 100 | 100–120 | No |

EXAMPLE 16
Reactive Electrocoating Resin Systems

A two-component reactive epoxy resin system (DOW ® DER332—diglycidyl ether of bisphenol A) and curing agent (diethylenetriamine or a polyamide epoxy adduct such as Versamid ® 5761) was prepared as a cathodic electrodepositable emulsion according to the procedures described in J. Oil. Col. Chem. Assoc., 53, 353–362 (1970). This system was electrodeposited onto a steel plate and produced films that could not be easily removed from its surface. Addition of a silicone emulsion or other resin release agents previously described in other examples resulted in film structures that could be transferred to other substrates. Since this is a reactive system, the films transferred then underwent cure reactions to produce three-dimensional network film structures.

EXAMPLE 17
Nonaqueous Electrodeposition

A 10% solution of a phenolic resin [Bakelite CKM 2432-Batch 1988 (Union Carbide)] and 1% Goodrite ® 1800X73 was made up in methyl isobutyl ketone solvent. This system was cathodically electrodeposited (30 sec, 130 volts) onto a copper plate which resulted in a very thin film which could be easily removed or transferred to a paper substrate.

EXMPLE 18
Nonaqueous Electrodeposition

A nonaqueous dispersion polymer and release additive in a chloroform-ethanol mixture was anodically deposited onto a copper metal anode resulting in a very thin film which could be easily removed or transferred to a polycarbonate or polystyrene film substrate. The nonaqueous disperion polymer was made up of a polyester stabilizer and poly(methacrylic acid) according to the procedures given in *Dispersion Polymerization in Organic Media* By K. E. J. Barrett, J. Wiley & Sons, New York, page 237 (1975). This polymer was partially neutralized with ammonia, blended with 1% of Goodrite ® 1800X73, and anodically deposited at 150 volts for 1 minute.

EXAMPLE 19
Powder Electrodeposition

A powder coating resin containing 9.2 parts methacrylic acid, 35 parts styrene, 10 parts hydroxyethyl acrylate, and 45 parts ethyl acrylate (acid number of 59) was dispersed into water (5% solids) containing enough dimethylethanol amine for 100% neutralization and anodically electrodeposited onto a steel plate (100 volts, 2 minutes). This system had relatively good adhesion to the steel plate and could not be easily removed. Addition of 1% Goodrite ® 1800X73 ($T_g+9$ C) or Hycar ® 2600X138 ($T_g+27$ C) resulted in powder-like metal surfaces which exhibited complete transfer from the steel plate to a heated polycarbonate film surface.

EXAMPLE 20
Powder Coating

A series of conventional powder coating resin systems
Epoxy—Epon ® 1001 (Caveat: Epon ® 1001 can be identically substituted with 1 mole of bisphenol-A reacted with two moles of the diglycidylether of bisphenol-A)
Acrylic—25% styrene, 53% methylmethacrylate, 12% butyl acrylate, 10% hydroxypropyl methacrylate
Polyester—neopentyl glycol, 0.976 moles trimellitic anhydride, 1 mole glycerin, 0.056 mole
were applied to hot steel plates and their resulting films were attempted to be transferred to a paper substrate. All of these conventional powder coating resins did not exhibit complete transfer to the paper substrate unless a special resin release additive was incorporated into the powder coating formulation. Some typical commercially available resins which can function as release effecting additives having $T_g$ values above 0 C with high elongation properties and which can effect polymer release properties are Hycar ® 2600X128 ($T_g$= +27 C)
Hycar ® 2600X91 ($T_g$= +20 C)
Hycar ® 1577 ($T_g$= +15 C)
Goodrite ® 1800X73 ($T_g$= +9 C)
Hycar ® 1877X8 ($T_g$= +7 C).

EXAMPLE 21

Butadiene Latex Polymers for Effecting Mold Release Characteristics in Electrocoating Formulations Complete experimental details for preparing emulsion polymers of butadiene can be found in "Emulsion Polymerization", F. A. Borez, I. M. Kolthoff, A. I. Medalia and E. J. Meehan, Interscience publishers, N.Y., pages 271–358, 1955. Several styrene or acrylonitrile copolymers of butadiene were prepared and are described in Tables 3 and 7.

EXAMPLE 22

Acrylic Latex and Solution Polymers for Effecting Release Characteristics In Electrocoating Formulations Latex or solution polymers having low acid numbers, low Tg values and high % elongations were prepared in a similar manner as Examples 1, 3, and 8 and are described in Table 7.

TABLE 7
ELASTOMERS (RELEASE-EFFECTIVE ADDITIVES) USEFUL IN ELECTROCOATED MOLD TRANSFER OPERATIONS

| Resin Type | Tg | % Elongation | Acid No. | Effective in Coated Mold Release Capabilities |
|---|---|---|---|---|
| 3% MAA, 15% MMA, 82% EA (acrylic) preparation procedures described in examples 1, 3 & 8 | −3 | 366 | 11–22 | Yes |
| 3% MAA, 80% BD 17% STY (styrene butadiene) preparation procedure described in example 18 | −56 | 1500 | 11–22 | Yes |
| (acrylic) 25% MMA, 75% BA | −30 | 2400 | | Yes |
| 35% BD, 63% sty, 2% MAA (preparation described in example 18) (styrene butadiene) | +9 | 350 | 11–22 | Yes |
| 45% BD/52% AN 3% MAA (butadiene-nitrile) | −16 | 1150 | 11–22 | Yes |
| 55% BD/42% AN/3% MAA (nitrile) | −30 | 940 | 30 | Yes |
| 45% MMA, 3% MAA 52% EA (acrylic) | +27 | 220 | 11–22 | Yes |
| 42% MMA 3% MAA 55% EA (acrylic) | +20 | 340 | 11–22 | Yes |
| (acrylic) 60% AA, 40% EA | +40 | 100 | over 150 | No |

MMA = methyl methacrylate
MAA = methacrylic acid
EA = ethyl acrylate
BD = butadiene
BA = butyl acrylate
AN = acrylonitrile
AA = acrylic acid
STY = styrene

EXAMPLE 23

A latex polymer was prepared according to Example 1 of U.S. Pat. No. 3,753,885 and electrodeposited and tested in an identical manner as described in Table 1 and Example 7 of this invention. The deposited thick coating (over 1 mil thickness) could be transferred from a metal substrate to a paper substrate but the resulting coating, when dried, exhibited a high degree of porosity in that a 1% methyl red (water) dye solution placed on the coated paper substrate wet the surface and underwent penetration into the paper substrate. An identical experiment was run again this time using the process and polymers of this invention (solution acrylic and low Tg release polymer additive) as described in Example 7. This deposited coating exhibited excellent transfer capability as a thin film (less than 0.1 to 0.5 mils) onto paper substrates but the resulting coating dried immediately and was not affected by the 1% dye solution (little or no wetting and no penetration over a 30 minute time period).

The coatings transferred from solution as described by U.S. Pat. No. 3,753,885 typically contain approximately 25% water by weight. The coatings transferred by this invention usually contain less than 1% water or are completely transferred as a dry film.

What is claimed is:

1. A process for electrodepositing a thin continuous film coating of less than 1 mil thickness onto a first substrate and then transferring said deposited thin continuous film coating onto a second substrate which comprises:
   (a) dispersing an anodic or cathodic electrodepositable polymer having at least 100% elongation, a surface energy of less than 50 dynes/cm., and, if anodic an acid number less than 100 or if cathodic an amine equivalency value less than 60;
   (b) dispersing a release effective amount of an anodic or cathodic elastomeric additive into intimate blend with said electrodepositable polymer, said additive having an elongation of at least 100%, a glass transition temperature greater than 0° C., and, if anodic an acid number less than 100 or if cathodic an amine equivalency value less than 60, so as to form an electrodepositable polymer-additive blend;
   (c) electrodepositing said electrodepositable polymer-additive blend onto a first substrate forming a coated first substrate;
   (d) contacting said coated first substrate to a second substrate so as to obtain greater adhesion between said electrodeposited polymer-additive blend and said second substrate than the adhesion between said first substrate and said electrodeposited polymer-additive blend;

(e) separating said electrodepositable polymer-additive blend from said first substrate by separating said coated first substrate from said second substrate so as to effect transfer of said electrodeposited polymer additive blend from said first substrate to said second substrate.

2. The process according to claim 1 wherein said anodic or cathodic electrodepositable polymer and said anodic or cathodic elastomeric additive are each copolymers or graft polymers.

3. The process according to claim 2 wherein said copolymers or graft polymers are comprised from monomers selected from the group consisting of styrene, methacrylic acid, acrylic acid, fumaric acid, tung oil, ethyl acrylate, butyl acrylate, methyl methacrylate, hydroxyethyl acrylate, butadiene, acrylonitrile, carbonate, silicone, phenol, formaldehyde, epoxy, maleic acid, acid esters, acrylic esters, methacrylic esters, vinyl monomers, and acid amic acids.

4. The process according to claim 1 wherein said electrodepositable polymer and elastomeric additive are dispersed into a solvent.

5. The process according to claim 1 wherein said first substrate is covered with a polymeric microporous electron coating so as to permit electron passage but restrict macromolecules.

6. The process according to claim 1 wherein said first substrate is a mold cavity.

7. The process according to claim 1 wherein said first substrate is a metallic cylinder.

8. The process according to claim 7 wherein said metallic cylinder is covered with a polymeric microporous electron coating sleeve which permits electron passage but restricts macromolecules.

9. The process according to claim 8 wherein said polymeric microporous electron coating is a polymer selected from the group consisting of perflourohydrocarbon or polypropylene.

10. The process according to claim 1 comprising the additional steps of:
(f) monitoring with a sensing means the thickness of the transferred polymer-additive blend on the second substrate.
(g) regulating the supply of current to said first substrate in response to the monitored thickness of the transferred polymer-additive blend.

11. The process according to claim 1 wherein said thin continuous film coating is of less than 0.5 mil thickness.

12. A process for electrodepositing a thin continuous film coating less than 1 mil thick onto a first substrate and then transferring said deposited thin continuous film coating onto a second substrate which comprises:
(a) dispersing an anodic or cathodic electrodepositable silicone polymer, said silicone polymer having a percentage of elongation greater than at least 100%, a surface energy value less than 27 dyne/cm, and, if anodic, an acid value less than 100 or, if cathodic an amine equivalency value less than 60;
(b) electrodepositing said electrodepositable polymer onto a first substrate forming a coated first substrate;
(c) contacting said coated first substrate to a second substrate so as to obtain greater adhesion between said electrodeposited polymer and said second substrate than the adhesion between said first substrate and said electrodeposited polymer;
(d) separating said electrodeposited polymer from said first substrate by separating said coated first substrate from said second substrate so as to effect transfer of said electrodeposited polymer from said first substrate to said second substrate.

* * * * *

UNITED STATES PATENT AND TRADEMARK OFFICE
CERTIFICATE OF CORRECTION

PATENT NO. : 4,566,962
DATED : Jan. 28, 1986
INVENTOR(S) : Vincent McGinniss

It is certified that error appears in the above—identified patent and that said Letters Patent is hereby corrected as shown below:

Column 4, line 23, "acid amine" should read -- acid or low amine -- .
Column 8, line 18, "a film" should read -- a fine film -- .
Column 8, line 23, "solven)," should read -- solvent), -- .
Column 12, line 29, "resion" should read -- resin -- .
Column 12, line 58, "substrte" should read -- substrate -- .
Column 13, line 8, "indentical" should read -- identical -- .
Column 14, Table 5, the second entry in the table should read across as follows:

| -- Anodic or the conventional electrocoating polymers described in Examples 3 and 8 | 0% | No transfer from metal mold surface to plastic surface |

Column 14, Table 5, the ninth entry in the table should read across as follows:

| -- Cationic Resin Aminated polybutadiene | 1% Goodrite ® 1800X73 | Complete Transfer |

Signed and Sealed this

Eighth Day of September, 1987

Attest:

DONALD J. QUIGG

Attesting Officer

Commissioner of Patents and Trademarks